Oct. 24, 1939.  W. E. LAWRENCE  2,177,302
TRANSMISSION MECHANISM
Filed Nov. 14, 1932  3 Sheets-Sheet 1
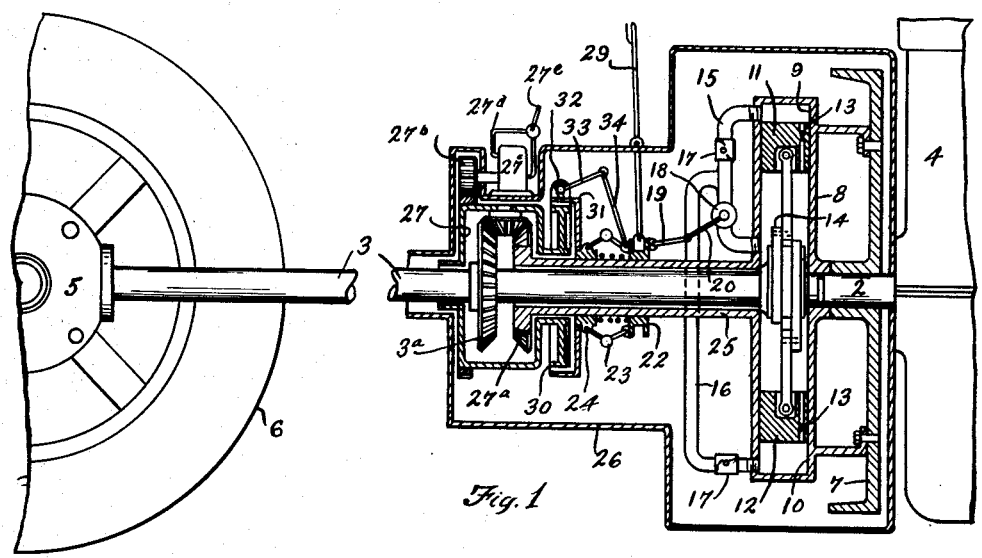
Fig. 1
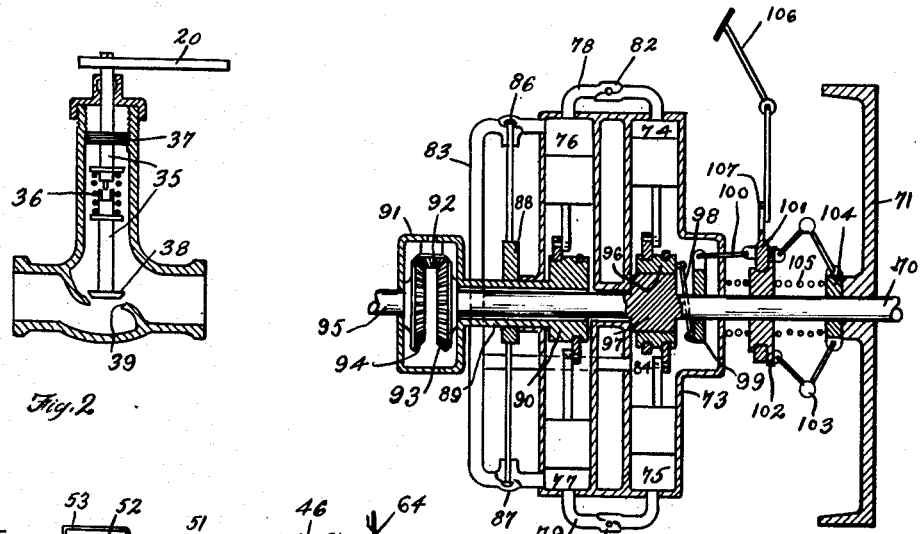
Fig. 2
Fig. 4
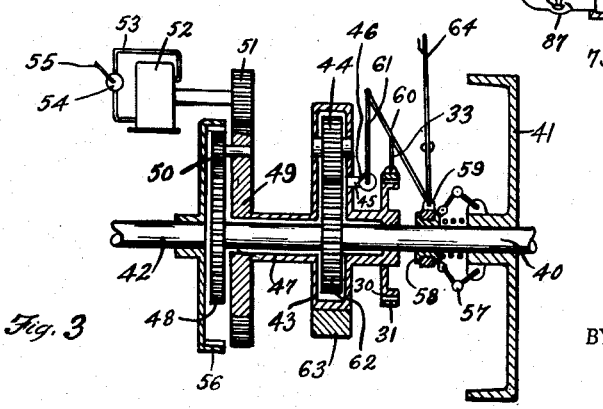
Fig. 3
INVENTOR.
William E. Lawrence
BY
Fay, Oberlin & Fay
ATTORNEYS.

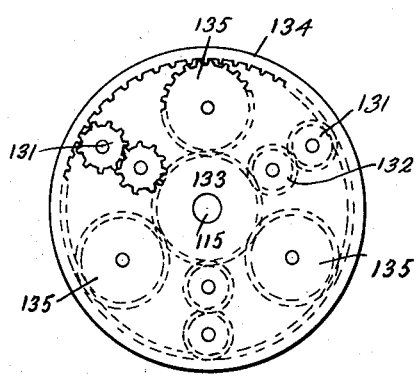
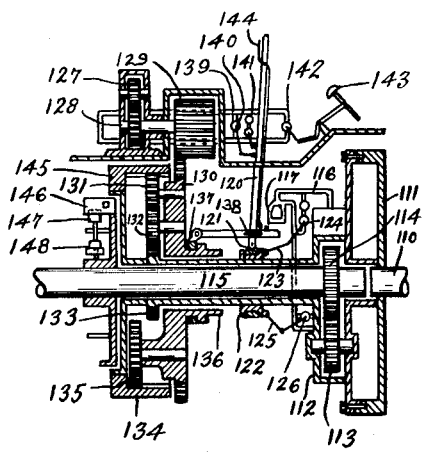
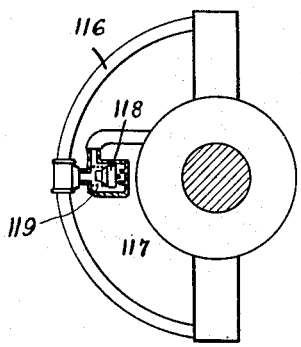
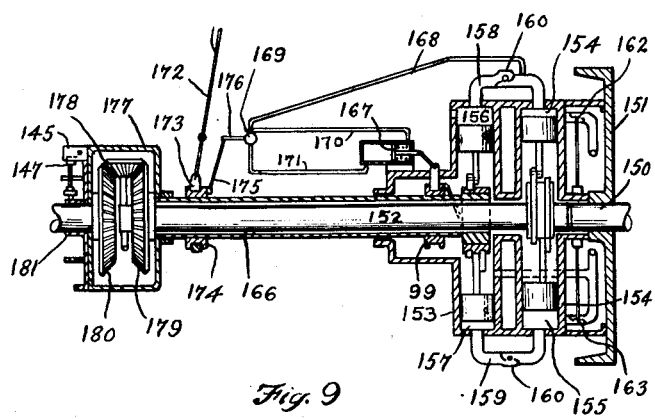
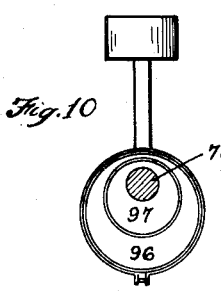
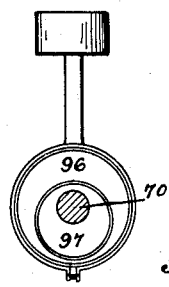
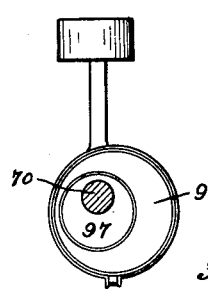
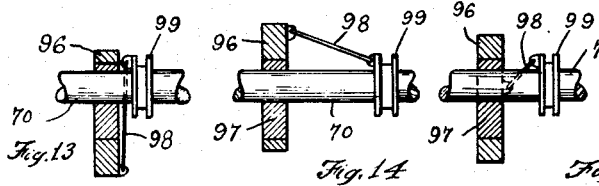

Oct. 24, 1939.    W. E. LAWRENCE    2,177,302
TRANSMISSION MECHANISM
Filed Nov. 14, 1932    3 Sheets-Sheet 3
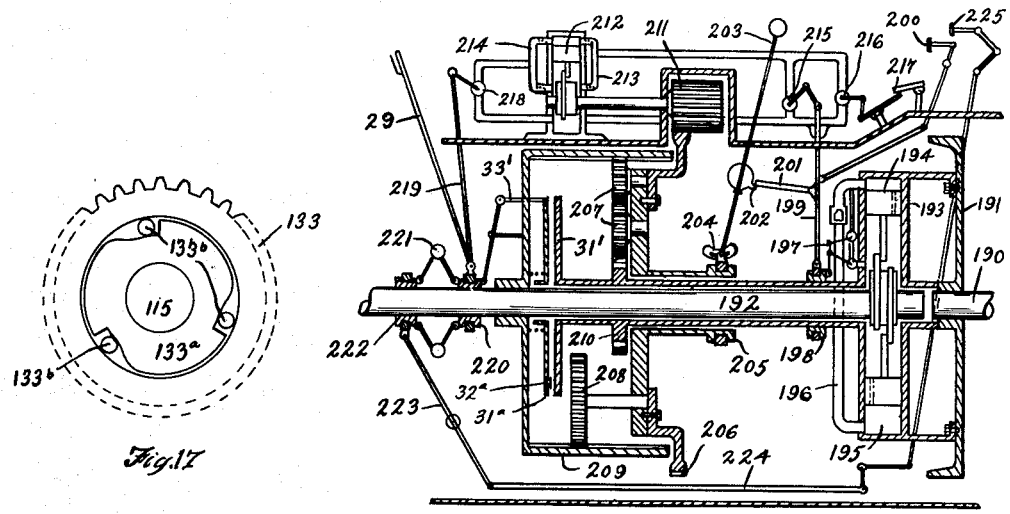
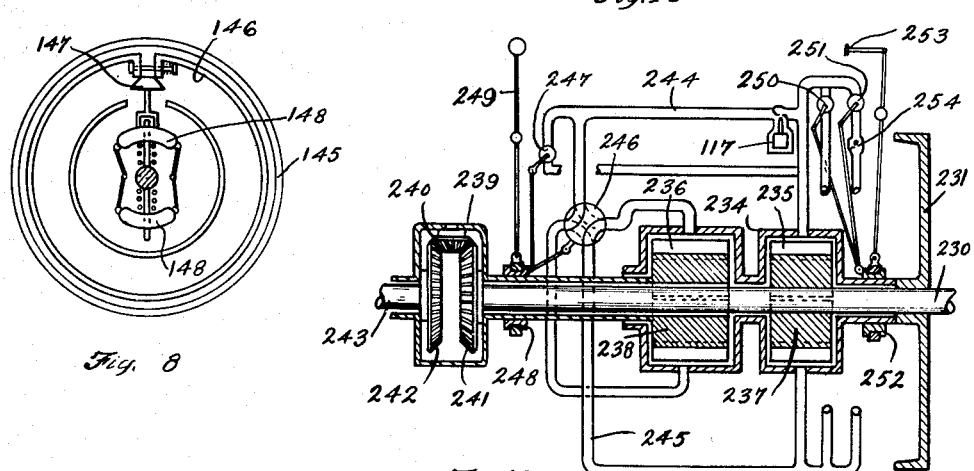
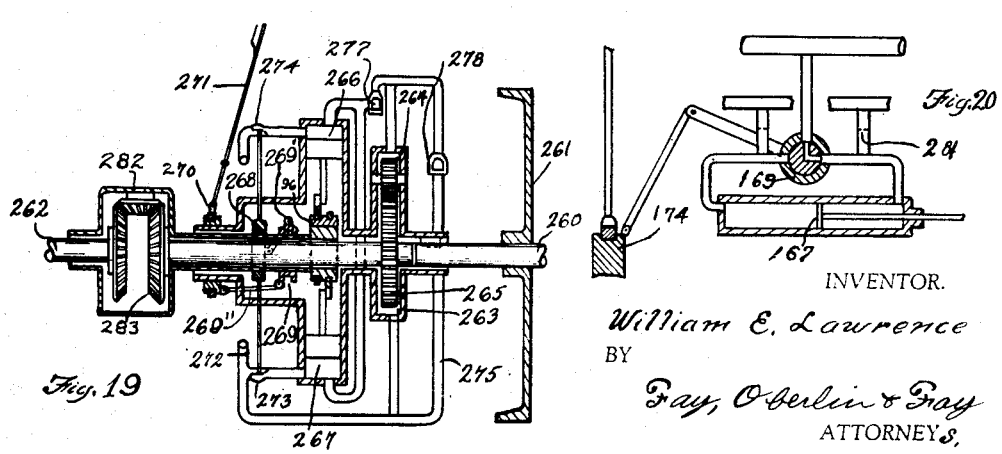
INVENTOR.
William E. Lawrence
BY
Fay, Oberlin & Fay
ATTORNEYS.

Patented Oct. 24, 1939

2,177,302

UNITED STATES PATENT OFFICE 2,177,302

TRANSMISSION MECHANISM

William E. Lawrence, Cleveland Heights, Ohio

Application November 14, 1932, Serial No. 642,494

46 Claims. (Cl. 74—293)

This invention, relating as indicated, to transmission mechanism, has more particular reference to mechanism making possible a variable transfer from a driver to a driven element; and it is among the objects of the invention to provide a construction allowing a flexible control of speed variation from zero motion to maximum speed, without resort to unduly fragile or complex features. A further object is the provision of such a construction which, notwithstanding a uni-directional motion in the driver, may make possible either direction in the driven element. Another object is the provision of a construction in which power delivery may be controlled with advantageous means and results.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

In said annexed drawings:

Fig. 1 is a vertical longitudinal section, parts being broken away, showing an embodiment of the invention; Fig. 2 is an enlarged sectional view of a detail; Figs. 3, 4 and 5, analogously to Fig. 1, are vertical longitudinal sectional views of modifications; Figs. 6, 7 and 8 are enlarged transverse sectional views of details; Fig. 9, analogously to Fig. 1, is a vertical longitudinal sectional view of a modification; Figs. 10, 11 and 12 are transverse sectional views, and Figs. 13, 14 and 15 are longitudinal sectional views of details; Fig. 16, analogously to Fig. 1, is a vertical longitudinal sectional view of a modification; Fig. 17 is a transverse sectional view of a detail; Figs. 18 and 19, analogously to Fig. 1, are vertical longitudinal sectional views of modifications; and Fig. 20 is an enlarged fragmentary longitudinal sectional view of a detail.

Referring more particularly to the drawings, there is shown in Fig. 1 a drive shaft 2, and a driven shaft 3, the former being operated by a uni-directional prime mover, such as an internal combustion engine 4, and the driven shaft 3 being illustrated as connecting through conventional differential means 5 to a rear axle of an automobile wheel 6. Secured to the driver 2, for instance by bolt-attachment to the flywheel 7 of the engine is a housing 8 containing piston-cylinders 9, 10, in which pistons 11, 12, are reciprocatively mounted, each piston having a one-way valve 13. The pistons are connected to crank or eccentric means 14 fastened to the driven shaft 3. A fluid-conduit 15 connects the outer end of the piston-chamber 9 with the common central chamber between the pistons, and another conduit 16 connects from the conduit 15 to the outer end of the piston-chamber 10. One-way check-valves 17 are provided in the respective conduits and a control-throttle valve 18 is provided in the conduit 15, arranged to be actuated by hand or automatically, or both, as for instance by link-connection 19 extending to the valve lever 20 from a slide collar 22. A fork rides therein and has an operating manual-lever 29. The latter is connected also with a centrifugal or fly-ball mechanism 23, the fixed collar 24 of which is fastened to a sleeve 25 which is an extension from the housing 8. Between the drive shaft and the driven shaft is a variable transfer gear. In the form illustrated, this may include one or more idler pinions in a cage 27 between the gear 27a fixed to sleeve 25 and gear 3a fixed to shaft 3. Gear teeth on the cage 27 mesh with a pinion 27b on the shaft of a fluid-pump of any preferred form, for instance a rotary or reciprocating pump 27c whose discharge is connected to its intake by closed-circuit conduit 27d which contains a control-throttle valve whose lever 27e is available for manual control.

From such construction it will readily be seen that with the drive shaft 2 actuated by the engine 4, the housing 8 turns therewith, carrying the pistons 11, 12 in revolution about the shaft 3 to which is fixed the crank or eccentric means 14, thereby causing the pistons to be correspondingly reciprocated and pump the pressure-fluid through the conduits 15, 16. As long as the valve 18 is open, the fluid proceeds through its circuit freely, and driving shaft and driven shaft move thus independently. If now the hand lever 29 be actuated, to close the valve 18, resistance is interposed to the liquid-flow, in proportion as the valve is shut, and correspondingly the piston system 11, 12 is impeded in its relative movement with respect to the housing 8, and, the valve 27e being open and the cage 27 being released, the shaft 3 takes on a forwardly-driving motion engaged to the drive shaft 2. By reason of the centrifugal control 23 and its connection also through slide 22 and link 19 to the valve 18, a certain speed of rotation to which the centrifugal control is set, will automatically tend to close the valve 18 and to oppose resistance to the fluid-flow and correspondingly bring about a transfer of motion to the shaft 3, so that stoppage of fluid causes fixed engagement, and partial stoppage causes variable engagement. The manual control means 29, as indicated, being superposed upon such centrifugal control, may of course take charge thereover at times desired by the operator. In sustained high speed running, as an advantageous refinement, I may employ an automatic connection means between driving and driven shafts in order to take the load off the fluid-pressure means. For this, a drum 30, somewhat on the order of a brake-drum may be fastened to the cage 27, while a surrounding split band 31 attached to the sleeve 25 is arranged to allow relative movement of the drum 30 or to be pressed thereon as actuated by suitable means. Such may involve for instance, a spreader-cam 32 oscillable by an arm 33 which is operated in turn by a link 34 from the collar 22, such that when the centrifugal device 23 slides the collar 22 toward the left, as illustrated in Fig. 1, the spreader-cam 32 is released and the band 31 closes upon the drum 30, being spring-impelled. The shaft 3 thus rotates in step with the sleeve 25, housing 8, and engine-flywheel 1, thus carrying the transfer-load instead of the otherwise-operating fluid-pressure system, and thereby lessening wear and tear and chances of leakage-development. In place of a mechanical engagement of brake-drum type to relieve fluid-pressure during touring engagement there may be used a friction disk engagement as shown in Fig. 16. This may consist of a disk 31' attached to the housing 193 and a disk 31a carrying friction surface pins 32a. Disk 31a is connected to sleeve 220 by a lever-link 33' for example. It will be seen then, that at accelerated speed the movement of governor collar 220 causes mechanical engagement between disks 31a and 31', causing fixed engagement of the driven shaft to drive shaft 190 and relieving the fluid-system. Manual control may be superimposed through a lever for the sleeve 220.

By providing the throttle valve 18 with a construction allowing some resiliency of movement, any tendency toward shock-hammer development in the fluid-pressure system is obviated. One form of desirable construction may involve for instance, a two-part valve stem 35 (see Fig. 2) having an interposed buffer-spring 36, the stem-parts 35 being splinedly engaging, whereby turning movement of the stem may be obtained, the screw-threaded mounting 37 advancing or withdrawing the valve 38 from its seat 39 on rotation of the valve stem by its lever-arm 20, while the spring-buffer 36 allows of some relative movement in the stem-parts.

In the form illustrated in Fig. 3, the drive shaft 40 with fly-wheel 41 is arranged in alignment with the driven shaft 42, and rotating on the drive shaft is a housing 43, which contains a rotary pump device with one of its elements 62 keyed to the drive shaft, and its other element 44 carried by the housing and having a fluid-pressure circuit conduit connecting between its discharge and intake as a closed circuit, and a throttle or resistance-valve 46 connected in the conduit. The shaft 40 carries a gear 48, and extending from the housing 43 is a sleeve 47 which carries fixedly-connected a gear 49, which furnishes a mounting for one or more idlers 50 engaging gear 48. Gear 49 meshes with a pinion 51 driving a fluid-pressure pump 52, which like the pump 44 has a closed-circuit fluid-conduit 53 from its discharge to its intake, a throttle or resistance-valve 54 being interposed and controllable by valve-lever 55 whereby to impose resistance to the fluid-flow in desired degree from zero to maximum. Keyed or otherwise fastened to the shaft 42 is an internal ring gear 56 which meshes with the idlers 50, as in the manner of epi-cyclic gearing generally well known. A centrifugal or fly-ball mechanism 57 having a fixed collar connected to the drive shaft 40 or fly-wheel 41, is provided with a slide collar 58 carrying a free collar 59 and connected by a link 60 to the valve-lever 61 of the valve 46. From this construction, it will be seen that, with the driving shaft 40 in rotation, the pump-gear 44 is actuated as it revolves about the gear 62 fixed to the drive shaft 40, the action of the pump being to correspondingly drive the pressure-fluid through its conduit 45 while the valve 46 is open. Valve 54 being open, when the speed of rotation of drive shaft 40 reaches its operating rate, the centrifugal means 57 draws the slide collar 58 toward the right, as shown in Fig. 3, correspondingly turning the valve-lever 61 by the link 60, and throttling down the valve and imposing resistance in the fluid circuit conduit, and in proportion progressively locking housing 43, and therefore the gears 49 and 50 and the driven shaft 42 into turning relation with the drive shaft 40. Vibration-development in the revolving system 44 may be eliminated by the provision of suitable counter-weighting 63. According as the valve 46 is closed more or less, the ratio of movement of the shaft 42 will be varied as to the movement of shaft 40, and variable speed from zero to a direct drive or 1 to 1 ratio may be had by partial and complete stoppage of fluid. For such optional variable control of the speed, a hand-lever 64 is superposed upon the valve-lever 61, and the automatic operation thereof may at any time be super-controlled by the manual means. As in the form of the invention described above, a mechanical coupling may be provided in order to take the load off the fluid-pressure system, if desired, for sustained high speed operation. For this, a drum 30, as already above-described, may be fixed upon the housing 43, while a band 31 with a spreader-cam actuated by cam-lever 33 may be connected to the centrifugal controlling-means 57 by link 60, whereby engagement of the mechanical coupling is had in connection with the operation of the centrifugal control-means. For reversing the direction of motion of the shaft 42, valve 46 being open, the reverse valve lever 55 is operated to close the valve 54, thereby opposing stoppage against flow in the fluid-conduit 53, and locking the pump and its gear 51 such as to compel the idlers 50 to determine the reverse travel of the ring-gear 56 thereabout.

In the form of the invention shown in Fig. 4, the drive shaft 70 and fly-wheel 71 is arranged with driven shaft 95 in general alignment, and rotating on the drive shaft is a housing 73 which contains piston-chambers 74, 75, 76, 77. Conduits 78, 79 connect the piston-chambers 74, 76 and 75, 7, respectively. Check-valves 82 insure one-way movement of the fluid stream. Another conduit 83 connects between the piston-chambers 76, 77, and the intermediate chamber 84 between the pistons in the piston-chambers 74, 75. In the conduit 83, valves 86, 87 are arranged to be alternately operated by cam or eccentric means 88 fixed to the sleeve 89 of the cam or eccentric 90 which operates the pistons in the piston-chambers 76, 77. This sleeve 89 is in turn joined to a cage 91 which carries one or more idler pinions 92 to ride between gear 93 fixed to drive shaft 70 and gear 94 fixed to driven shaft 95. The pistons in the piston-chambers 74, 75, are actuated by a cam or eccentric 96, which may be set for a variable throw from zero to maximum. For this, the eccentric section 97 (see also Figs. 10–12) is fixed to the shaft 70, while an adjustable eccentric sleeve-member 96 is rotatable or rather oscillable thereabout, as set by the arm 98 which connects to a slide-collar 99 (see also Figs. 13–15).

The slide collar 99 is in turn connected by a link or links 100 to a free collar 101 in a slide collar 102 forming part of a centrifugal or flyball means 103 whose fixed collar 104 is secured to the fly-wheel 71. The slide collar 102 works on shaft 70. The arrangement of the curved link 98 is such that movement of the collar 99 along the shaft 70 imparts a rotary turning movement to the eccentric-sleeve 96, thereby correspondingly changing its set or position relative to the core-eccentric 97, and the effect of the centrifugal means 103 when up to speed is to draw the slide 99 toward the right in Fig. 4, and turn the eccentric-sleeve 96 to a position illustrated in Figs. 11 and 14. A manual control means is superposed upon this automatic control, and may take the form of a pedal lever 106, arranged to engage against lug 107 on the fork 101 in the slide 102, thereby shoving the latter in a direction counter to that imposed by the operation of the centrifugal means 103.

As will be seen, in the operation of the mechanism shown in Fig. 4, the drive shaft 70 turns in uni-directional movement, carrying the cam 97 in rotation. Actuation of the pistons sets up fluid circulation, and to the extent that resistance is imposed on this circulation, rotation is imparted to the compressor housing 73, free on shaft 70, until under fluid stoppage locked engagement of housing 73 to shaft 70 ensues. With the eccentric-sleeve 96 set in the position indicated in Figs. 11 and 14, as may be readily accomplished by the manual control 106, operating upon the slide 102 and the eccentric-setting slide 99, the pumping-couple 74, 75 is out of action, and the pumping-couple 76, 77 is in action, stopping the fluid stream through the conduits 79, 83, and the cage 91 with its pinion 92 is held such as to in effect lock gear 94 to gear 93, thereby giving a 1 to 1 ratio movement from shaft 70 to shaft 95. When the eccentric-sleeve 96 is set to the position indicated in Figs. 12 and 15, the pumping-couple 74, 75 operates half throw on each reciprocation, and the total effect upon the fluid pressure system is to cause idling or zero motion of the shaft 95. At variable points between half-throw and zero-throw of the cam 97, and sleeve 96, forward motion is produced with variable increase of speed governed by the controlled rotation of cage 91 and gear 92. Again, when the eccentric-sleeve 96 is set in the position indicated in Figs. 10 and 13, the pumping-couple 74, 75 is in full reciprocation and the direction of the rotation of the cage 91 is backward toward standstill of the cage causing rotation of the shaft 95 to be reversed, with similar control of increased torque.

In the form of the invention shown in Fig. 5, there is again a drive shaft 110, with fly-wheel 111, to which is attached a housing 112 containing gear pump mechanism 113, 114, the latter being fixed on shaft 115. The pumping mechanism 113 has a fluid circuit conduit 116 from discharge to intake, and interposed is a centrifugally-operated valve 117 (see also Fig. 7). In this, the valve is provided with a suitable weighting 118 to overcome the spring 119 at a certain speed, and set the valve out against the valve seat, and correspondingly oppose resistance to the flow of the fluid, and in effect lock the pump rotor and casing together, thereby occasioning movement of the shaft 115 in step with the drive shaft 110. For suitable control, a manual-control means 120 is arranged, and this may take the form of a lever engaging by a fork 121 with a slide collar 122 from which a link 123 connects to the valve-lever of a valve 124 arranged as a by-pass across the centrifugally-operated valve 117. Connecting also with the slide 122 is a link 125 to the valve lever of a valve 126. Another pumping-unit comprising pump-gears 127, 128, is arranged to be driven through the intermediary of gear 129 and driving gear 130 which forms part of an epi-cyclic system including idlers 131, 132 carried on the gear 130, the idler pinion 132 meshing with a central or sun-gear 133 which is fixed to an extension sleeve integral or connected with the housing 112. The idler 131 in turn meshes with an internal ring gear 134 which is secured to the driven shaft 115. Carried also by the gear 130 is an idler 135, spaced out in a plane separate from that of the idlers 131, 132, and the entire gear 130 with its idlers is slideable axially by its sleeve 136. The sleeve 136 is provided with a collar and a fork 137 which is operated by an arm having pin and slot engagement 138 with the lever 120. With such construction, the gear 130 may be set such as to effect a drive in one direction through idlers 131, 132, or in the opposite direction through idler 135, according as one set or the other is slid into mesh with the sun-gear 133. The pump 127, 128 has a fluid-circuit conduit 139 with a by-pass valve 140. The valve is operated by a link connected between the hand lever 120 and the valve lever, and when the valve is open, the fluid stream flows freely in circuit; but when the valve is closed, resistance is opposed, and the effect is to proportionately lock the pumping mechanism and hold the gear 130, thereby causing differential travel for the associated gearing-trains. A by-pass valve 141 is arranged such that its valve-lever will be struck and closed by a pin on the hand-lever 120 as the latter is drawn back. Another throttle or resistance valve 142 has its valve-lever operated by a link and bell-crank connected to the accelerator pedal 143.

In the operation of the mechanism shown in Fig. 5, as readily understood, when the drive shaft 110 with its connected housing 112 is at a certain speed, the centrifugally-operated valve 117 closes the fluid-conduit, and in effect locks the pump gear 114 and housing 112 together, thereby imparting 1 to 1 ratio forward rotation of shaft 115. By operation of the manual-control 120, the slide collar 122 may be moved such as to open the valves 124, 126, thereby lessening the resistance in the fluid-circuit, and allow relative movement correspondingly between housing 112 and pump-element 114, with corresponding change in the ratio of speed and slowing down of the shaft 115 with respect to drive-shaft 110. By reason of the connection of the collar 137 to the manual control lever 120, movement of the latter also serves to change the setting of the gear 130 with respect to its idlers and the sun-gear 133. The pin and slot connection 138 allows this shift of the gear-system 130 to be effected in such relation to the operation of the valves 124, 126, that the gear-shifting is performed during idling. With movement of the manual control lever 120, the valve 140 is closed in such sequence that the reverse pump 127, 128 is correspondingly progressively availed of, the straight-away pump 113, 114 being in idling position, to effect a reverse-drive of the shaft 115. Arranged on the hand-lever 120 is a thumb-controlled detent or pawl-lever 144 which at its lower end may engage a pin on the arm which connects to the gear-shift fork 137. That is, in the normal spring-raised position of the pawl-lever 144, the pawl-tip rides free over the pin, but by operation of the pawl-lever as in the customary manner of pawl-lever operation, the pawl-tip may be depressed so as to engage the pin on the shaft-connection. It will be further seen that when the foot accelerator 143 is depressed throttle valve 142 is closed thereby, so that gear 130 is held to standstill, engaging drive shaft 110 through gear 133, gears 132 and 131 to ring gear 134, attached to driven shaft 115. At the same time with the partial closure of valve 117, under centrifugal force, pressure is set up within compressor 112, exerting a turning force upon driven shaft 115 through partial stoppage of fluid in conduit 116. When the acceleration of vehicle increases the rotation of driven shaft 115 adequately, the drive connection is continued through compresor 115 with stoppage of fluid at valve 117, while gear 130 is carried to forward motion sufficiently to reverse the direction of rotation of pump 127, 128, and reverse the direction of fluid pressure in conduit 139. At this point, by-pass valve 141 provides automatic release of fluid pressure, thereby disengaging pump 127, 128 from any retarding effect upon gear 130, which is thus allowed to idle freely. Thus after initial inertia is overcome through gear-train 133, 132, 131, 134, direct engagement is taken up between drive shaft 110 and driven shaft 115. If lever 120 is advanced to still further forward position, automatic coasting by-pass 126 is opened, allowing disengagement in coasting, whenever vehicle speed surpasses motor speed, thereby reversing the direction of flow in conduit 116. If however, lever 120 is withdrawn to a neutral or middle position, valves 140 and 126 are both opened, causing pressure release in both systems, or manual disengagement. Further withdrawal to a rearward position of lever 120 shifts the train of gears to the point where reversing gear 135 is engaged between gear 133 and ring gear 134, forward gears 131 and 132 being disengaged. Thereupon, depression of foot-accelerator 143 causing stoppage in conduit 139, reverse motion of vehicle is caused. During this shift of gears, lever 120 is able to close the conduit 139 at the conclusion of the shift by reason of the differential movement in the pin and slot mode of connection between the arm to the gear-shift fork 137 and the lever 120. Also in reverse position, lever 120 closes automatic release by-pass 141, giving positive reverse engagement. Return shift to forward gear engagement may be accomplished by thumb-controlled detent or pawl-lever 144. Again, for the purpose of taking the load off the fluid pressure-system during sustained running, an automatically-operating direct coupling may be incorporated, and while this may be of detail as described in connection with Figs. 1 or 3, another desirable form, as shown in Fig. 8, involves a drum 145 within which is a split expanding ring 146 on the order of a brake-element, and a radially-directed wedge 147 acting between the ends of the split-ring to expand the same, the wedge having an actuating weight 148 which at destined speed centrifugally forces the wedge 146 outward and expands the split ring against the drum, thereby locking the parts together, and since the drum is secured to the sleeve which is integral with the housing 112, and the split ring inside is secured to the shaft 115, the latter will rotate in step with the housing 112 and the engine fly-wheel.

The form of the invention shown in Fig. 9 is a modification of Fig. 4, exhibiting another method of controlling the variable throw of the pistons. It also shows a compressor system bolted to a fly-wheel instead of free on the drive shaft, with the addition of an intermediary shaft between the drive and driven shafts. The drive shaft 150 and the fly-wheel 151 are again arranged with intermediary shaft 152 and driven shaft 181 in alignment, and a housing 153 secured to the fly-wheel contains piston-chambers 154, 155 and 156, 157. A fluid-conduit 158 connects between chambers 154 and 156, and a conduit 159 connects between chambers 155 and 157. Check-valves 160 are included in each conduit. A conduit connects between chambers 154 and 155, and valves 162, 163 are arranged at each side of an intermediate conduit-connection to the intermediate fluid space between the pistons of chambers 156, 157. Each of the pistons in chambers 156, 157 contains a one-way valve, whereby the fluid may be pumped through the fluid circuit indicated. Fixed on the shaft 152 is a cam or eccentric for operating the pistons in chambers 154, 155, and the pistons in chambers 156, 157 are operated by a variable cam whose detail construction, similar to that in Figs. 4, 10–15, may include a central core or cam 97 fixed to the sleeve 166, and an eccentric sleeve 96 rotatable or rather oscillable upon the element 97. A link again connects the eccentric-sleeve 96 with a slide 99, whereby axial movement of the latter is converted into arcuate throw of the eccentric sleeve 96, as already indicated in Figs. 13–15. For actuating the slide 99 a fluid-operated plunger 167 with its connecting link may be arranged to be moved by the pressure in the pumping system, whereby the plunger 167 appropriately sets the slide and its connected variable eccentric 96. A fluid-line 168 for this purpose may connect through a two-way valve 169 to port-connections 170, 171 at the respective sides of the plunger 167, and a manual-control 172, through a fork 173 may operate a slide 174 having a connecting link 175 to the valve-lever 176 of the valve 169. With such arrangement, according as the lever 172 is thrown one way or the other, the slide 174 actuates the valve-lever 176 to direct the pressure-fluid to one side or the other of the piston 167 and thereby throw the variable cam 96 in its different positions. Connected to shaft 152 is a gear-cage 177 carrying one or more pinions 178 between the gear 179 which is fixed to sleeve 166, and gear 180 which is fixed to the tail shaft 181. According as the cage 177 with its pinions 178 is allowed to run free in idling movement, or is more or less retarded, the ratio of transfer between the gear 179 on the driving side and the gear 180 on the driven side is varied, and as is generally apparent from the foregoing description, when the engine and fly-wheel 151 are turning, the housing 153 rotates and causes a pumping action with the pistons in the chambers 154, 155 and 156, 157. When the variable cam-element 96 is set in the position indicated in Fig. 11, this pumping-couple is inactive, and the pumping-couple 154, 155 is operating, with the result of determining a forward movement for the tail shaft 181, etc. When the cam-element 96 is set to the position indicated in Fig. 12, the pumping-couple 156, 157 has a half reciprocation action, and the result is an idling release. When the cam-element 96 is set to the position indicated in Fig. 10, the pumping-couple 156, 157 receives full reciprocation, and effects the turning back of the cage 177 to a standstill, thereby giving a reverse drive direction to the tail shaft 181. As in the form shown in Fig. 5, a direct-coupling, centrifugally-operated, may be provided, if desired, to carry the load during sustained speed, and this likewise may involve such a construction as drum 145, expansion band 146, and centrifugally-operated spreader-cam 147.

In the form shown in Fig. 16, again the drive shaft 190 and fly-wheel 191 are arranged with a driven shaft 192 in alignment, and a housing 193 secured to the fly-wheel 191 contains piston-chambers 194, 195, a fluid conduit 196 connecting therebetween, and having an intermediate connection to the intermediate chamber between the pistons, with a control valve 197. The latter valve is operated by a slide 198 having a fork connected to a lever 199 and operated by a link and lever connection to a dash-control 200. Projecting from the lever 199 is a link 201 standing in the path of a cam 202 which is oscillable with the shift-lever 203. The lower end of this lever is expanded and has a pin and slot or lost-motion connection 204 to a fork on a slide 205 which is secured to the gear-plate 206. The latter carries idler pinions 207 and 208, both meshing with the internal ring gear 209, and meshable with the central or sun-gear 210, which is fixed to a sleeve integral with the housing 193. The spacing of the idlers 207 and 208 is such that slide movement of the gear-plate engages first one set with the sun-gear 210, then none, then the other. Meshing for forward, neutral, and reverse, is thus arranged, as determined by the throw of the shift-lever 203. The gear 206 also meshes with a pinion 211 which drives a pump 212 having fluid-conduits 213, 214 between its discharge and intake. Check-valves are provided in these conduits for one-way flow. A by-pass, with a valve 215 has its valve-lever connected by a link to the upper arm of the lever 199 aforementioned. A throttle control valve 216 is arranged such that the valve-lever of the latter is operated when the accelerator pedal 217 is actuated. Another by-pass with a valve 218 is arranged such that the valve-stem of the latter is actuated by a link connection 219 to a fork on a slide 220. To this is connected a centrifugal or fly-ball couple 221, and the other collar 222 thereof is also slideable as controlled through lever 223, link 224 and bell-crank and link connections to a dash-control 225.

As will be understood from the foregoing, the shift-lever 203 is, in operation, set to engage the appropriate idler-train 207 with the sun-gear 210 for forward movement. As seen, the shift-lever has a slightly delayed engagement by virtue of the lost-motion connection 204, and thus the cam 202 as swung by the shift-lever has time to open the by-pass control valves 197, 215 first, and by the opening thereof, the fluid in the pumping circuit flows without resistance and the gearing being in idling relation, the shift may be made appropriately. The dash-control 200 also operates valves 197, 215 and allows opening thereof, with release of resistance in the fluid system, and consequent idling out through the gearing. As the control valves 197, 215 are progressively closed in proportion, resistance is imposed in the fluid system, and the transfer of motion through the gearing occurs, and whatever speed is desired may be attained. For reverse, the shift-lever 203 is appropriately thrown, to bring the reverse set of pinions into mesh with the sun-gear 210, and again the throttle is controlled, determining the amount of resistance in the fluid system, and the consequent speed imparted through the gearing. At the same time, cam 202 releases valve 197, but not 215, so that reverse motion may not be impeded by compressor 193. For taking the load off the fluid system at sustained speed, a direct coupling means, along the lines described in connection with Figs. 1, 3, 5 and 9 may be applied if desired, and may comprise disks 31, 32, operating link-lever 33, and connection to the slide 220 actuated by the centrifugal means. In accelerating, centrifugal means may also operate at the appropriate point to open valve 218, thereby disengaging the planetary gear train 206, 207, 210 from retarding the motion of vehicle after compressor 193, through the influence of automatic centrifugal valve stoppage in conduit 196, has assumed the load. An alternative mode of automatic disengagement is also shown in the construction of gear 210 (see also Fig. 17), which is equipped with a ball ratchet device. Thereby in starting conditions, core 133a, keyed to the sleeve integral with housing 193, throws the balls centrifugally to secure locked engagement with gear 133, so that engagement of drive shaft to driven shaft is secured with torque increase through the train 210, 207, 209, gear 206 being at standstill. But with increased velocity of vehicle, the gear train is thrown out of engagement, eliminating retarding effect when gear 133 is impelled to rotate faster than core 133a.

In Fig. 18, a compact form employing rotary-type pump-elements is shown, the drive shaft 230 and fly-wheel 231 being connected to drive gear 241 and a housing 234 being free to rotate around drive shaft 230. Within the housing 234 are rotary-chambers 235 and 236, and within these are rotors, for instance of vane-type 237 and 238, respectively. The rotor 237 is fastened to the shaft 230, while the rotor 238 is fastened to a sleeve which is integral with gear cage 239, carrying one or more pinions 240 between drive gear 241 on shaft 230 and driven gear 242 on tail shaft 243. A fluid-conduit 244 connects between rotor-chambers 235 and 236, while a conduit 245 connects between chambers 236 and 235 oppositely. In the conduit 244 a centrifugally-operated valve 117 may be arranged and the construction of this may follow the lines already described in connection with Fig. 7. A control valve 246, of two-channel type, is arranged to control the direction of fluid-flow in the conduit 244, 245, and a by-pass with a valve 247 shunting the centrifugal valve 117 is also provided, the respective valve-levers of these valves being operated through a common link-system from the collar 248 having a fork connected to a manually-operated lever 249. Another by-pass around the centrifugal valve 117 has a valve 250, and an additional by-pass is provided with a valve 251, the valve-levers of these valves being connected by links to a slide collar 252, whose fork is operated by a control 253.

In the operation of the form shown in Fig. 18, when the engine and fly-wheel 231 is turning, the shaft 230 likewise turns against the rotor 237, and through gears 241, 240 it turns rotor 238 at one-half rotation speed. Fluid is pumped through the conduits. Idling control 250 being closed, rotation of housing 234 ensues. With the centrifugal valve 117 setting up, the fluid encounters corresponding resistance, and relative motion between the housing and rotors is impeded, and with full operation of the centrifugal valve, rotation of housing and rotor together results in rotation of the cage 239 in lock engagement with gears 241 and 243, giving forward movement in 1 to 1 ratio. At starting or under excessive vehicle inertia, valve 250 is unable to close completely, permitting slippage or relative movement of housing 234 and rotors, thereby permitting cage 239 with idler 240 to rotate relatively, with consequent idling. The centrifugal valve 117 sets up slippage under pressure, fluid-pressure exerting turning movement throughout. The fluid which slips, passes to pump 238, yielding a 3 to 1 torque increase. If the pump 238 should be twice the capacity of pump 237, rotation would be in the ratio of 6 to 3, or 2 to 1, with free run-around. By having pump 238 one and one half times the capacity of pump 237, rotation is in the ratio of 6 to 4, or six turns of gear 241 to four turns of cage 239. If three turns of cage 239 constitutes a free release, one more turn would constitute a multiplication of torque by three. The torque increase in any case may be arranged as desired in accordance with the relative size of the pump. For reverse, fluid is by-passed at valve 247 around the centrifugal valve 117, by appropriate movement of the lever 249. Flow from pump 237 to pump 238 is reversed, thereby holding cage 239 to two revolutions to six revolutions of shaft 232. Pinion 240 then exerts reverse motion on gear 242 in 3 to 1 torque increase. By opening valve 251, free flow of fluid with automatic coasting through the one-way valve 254 is permitted whenever the vehicle speed exceeds that of the engine, thereby reversing the direction of fluid-pressure. A similar transmission might be constructed with reciprocating pumps, with appropriate arrangement of conduits and their valves.

The form of the invention shown in Fig. 19 shows the modification of Fig. 18, by reciprocating or gear pump means. If a reciprocating pump be used, in place of a control valve of two-channel type such as 246 in Fig. 18, it may be desired to cause reverse action by altering the closed position of valves 274 and 273 relative to the cage. This is accomplished by change of the position of the valve actuating cam 268 through movement of the slide-collar 269 and link-connection 269', as controlled through connection 269 by a manual lever 271 connected to free fork or collar 270. A further modification is that housing 263 is keyed to the drive shaft 260, while the rotor member 265 is carried through an intermediary shaft to the gear 283. In this form, the drive shaft 260 with fly-wheel 261 is arranged with the driven shaft 262 in alignment. The housing 263 is secured to the drive shaft 260, and contains the gear pump set 264, 265, the latter being fixed to the intermediate shaft. The housing contains also plunger pump chambers 266, 267, within which are pistons operated by a cam or eccentric. Connecting the pump-chambers 266 and 267 is a fluid-conduit 272, having valves 273, 274, actuated by a central cam, and the pump is operated by a variable cam 96, 97, whose position is controlled by slide-collar 269 actuated through free collar 270 by manual lever 271. A conduit 275 connects the discharge and intake of the gear pump 264, 265, and also extends to plunger-pump chamber 266 and conduit 272. In the conduit 275 is an automatic idling control-valve 278.

In the operation of this form of the invention it is assumed that pumps 264, 265 and 266, 267 are of unequal fluid capacity, so that pump 266, 267 is larger, but less than twice as large as pump 264, 265, at whatever intermediary degree may be necessary to achieve a given torque increase. Then as in Fig. 18, stoppage of flow at 277, automatic idling valve 278 being closed, causes circulation stoppage throughout, with 1 to 1 engagement of drive and driven shaft. But any fluid slipping under excess vehicle inertia through centrifugal valve 277 out of compressor 264, 265 into 266, 267, is put to work to accelerated rotation of cage 282 beyond one-half rotation, thereby causing increase of speed. Or, cam 268 being reversed, circulation to pump 266, 267 retards revolution of cage 282, thereby causing reverse motion of vehicle.

In any of the various forms, as for instance in gear 133 in Fig. 5 or gear 210 of Fig. 16, there may be incorporated the slip-type of connection, as shown in detail in Fig. 17, in which the central or sun-gear 133 encloses core 133a having recesses with rolling-elements 133b, the recesses being inclined such that when the shaft 115 is driving faster than the gear 133, the latter is locked with it, but when the gear 133 as determined by its associated mesh-connections turns faster than the shaft 115, free run-over is permitted.

In instances of valves such as valve 169, Figs. 9 and 20, it is desirable to provide a calibrated pin-hole release, to relieve pressure. This may be arranged in the connection from the return fluid line, as at 281, Fig. 20.

Other modes of applying the principle of my invention may be employed instead of the one explained, change being made as regards the mechanism herein disclosed, provided the means stated by any of the following claims or the equivalent of such, be employed.

I therefore particularly point out and distinctly claim as my invention:

1. Drive mechanism of the character described, comprising a drive shaft, a driven shaft, a variably movable transfer gear between the drive shaft and the driven shaft, fluid-pressure means normally independent of said transfer gear for controlling the movement of said transfer gear to produce forward travel, and fluid-pressure means for controlling the movement of said transfer gear to produce reverse travel.

2. Drive mechanism of the character described, comprising a drive shaft, a driven shaft, a transfer gear therebetween, fluid-pressure means to arrest said transfer gear to produce reverse motion of the driven shaft, and fluid-pressure means normally independent of said transfer gear to engage said transfer gear to said drive shaft to produce forward motion of the driven shaft.

3. Drive mechanism of the character described, comprising a drive shaft, a driven shaft, a variably movable transfer gear between the drive shaft and the driven shaft, fluid-stoppage means normally independent of said transfer gear for controlling the movement of said transfer gear to produce forward travel, and fluid-stoppage means for controlling the movement of said transfer gear to produce reverse travel.

4. Drive mechanism of the character described, comprising a drive shaft, a driven shaft, a transfer gear therebetween capable of forward or reverse movement, fluid-pressure means to control the movement of said transfer gear forward and reverse, and clutch-means for engaging the transfer gear to produce driving of the driven shaft.

5. Drive mechanism of the character described, comprising a drive shaft, a driven shaft, a transfer gear therebetween capable of forward or reverse movement, fluid-pressure means to control the movement of said transfer gear forward and reverse, clutch-means for engaging the transfer gear to produce driving of the driven shaft, and automatic means for controlling said clutch-means.

6. Drive mechanism of the character described, comprising a drive shaft, a driven shaft, a transfer gear therebetween capable of forward or reverse movement, fluid-pressure means to control the movement of said transfer gear forward and reverse, and ratchet-like means for disengaging the gear-drive.

7. Drive mechanism of the character described, comprising a drive shaft, a driven shaft, a transfer gear therebetween capable of forward or reverse movement, fluid-pressure means to control the movement of said transfer gear forward and reverse, and automatic fluid-pressure release means for releasing the control of said pressure means.

8. Drive mechanism of the character described, comprising a drive shaft, a driven shaft, a variably movable transfer gear between the drive shaft and the driven shaft, fluid-pressure means including a variable-throw piston for controlling the movement of said transfer gear and a variable eccentric for operating said piston, said variable eccentric including a central eccentric connected to the pistons and mounted on an eccentric.

9. Drive mechanism of the character described, comprising a drive shaft, a driven shaft, epi-cyclic gearing including a gear on said drive shaft and a gear on said driven shaft and an idler gear therebetween, a fluid-pump having one element connected to the drive shaft and another element connected to said idler, another fluid-pump also connected to said idler, and means for controlling the respective fluid-pumps.

10. Drive mechanism of the character described, comprising a drive shaft, a driven shaft, epi-cyclic gearing including a gear on said drive shaft and a gear on said driven shaft and an idler gear therebetween, a fluid-pump having one element connected to the drive shaft and another element connected to said idler, centrifugally-operated means for controlling said fluid-pump, another fluid-pump connected to said idler, and means for controlling said last-named pump.

11. Drive mechanism of the character described, comprising a drive shaft, a driven shaft, an intermediary shaft, fluid-pump means having one element connected to said drive shaft and another element connected to said intermediary shaft, epi-cyclic gearing including a gear connected to said intermediary shaft and a gear connected to said driven shaft and an idler between such intermediary gear and driven gear, another fluid-pump means having one element connected to said drive shaft and another element connected to said idler-gear, and means for controlling the respective pump-means.

12. Drive mechanism of the character described, comprising a drive shaft, a driven shaft, an intermediary shaft, fluid-pump means having one element connected to said drive shaft and another element connected to said intermediary shaft, epi-cyclic gearing including a gear connected to said intermediary shaft and a gear connected to said driven shaft and an idler between such intermediary gear and driven gear, another fluid-pump means having one element connected to said drive shaft and another element connected to said idler-gear, means for controlling the respective pump-means, said means including inter-connecting conduits between the respective pump-means, and a throttle-valve in one of such conduits.

13. Drive mechanism of the character described, comprising a drive shaft, a driven shaft, an intermediary shaft, fluid-pump means having one element connected to said drive shaft and another element connected to said intermediary shaft, epi-cyclic gearing including a gear connected to said intermediary shaft and a gear connected to said driven shaft and an idler between such intermediary gear and driven gear, another fluid-pump means having one element connected to said drive shaft and another element connected to said idler-gear, means for controlling the respective pump-means, said means including inter-connecting conduits between the respective pump-means, and a manually controlled throttle-valve and a centrifugally controlled throttle-valve in one of such conduits.

14. Drive mechanism of the character described, comprising a drive shaft, a driven shaft, epi-cyclic gearing including a gear on said drive shaft and a gear on said driven shaft and an idler therebetween, fluid-pump means having a rotor connected to said drive shaft and a housing connected to said idler-gear, another fluid-pump means in association with said idler-gear manually-operated means for controlling the first-named pump-means centrifugally-operated means for controlling the same pump-means, a clutch between said drive shaft and said pump-means housing, means for connecting said clutch to said manual-control means and said centrifugally-operated control means, and manually-operated control means for said second-named pump.

15. Drive mechanism of the character described, comprising a drive shaft, a driven shaft, epi-cyclic gearing including a gear connected to said drive shaft and a gear connected to said driven shaft and an intermediary gear between said drive shaft gear and driven shaft gear, a fluid-pump including pistons and an actuating cam-means, the latter connected with said idler-gear, another fluid-pump including plungers and variable-throw cam operating means, manually-controlled means for actuating said variable-throw means, and centrifugally-operated means for actuating the same.

16. Drive mechanism of the character described, comprising a drive shaft, a driven shaft, epi-cyclic gearing including a gear connected to said drive shaft and a gear connected to said driven shaft and an intermediary gear between said drive shaft gear and driven shaft gear, a fluid-pump including pistons and an actuating cam-means, the latter connected with said idler-gear, another fluid-pump including plungers and variable-throw cam operating means, manually-controlled means for actuating said variable-throw means, centrifugally-operated means for actuating the same, and fluid-circuit conduits connecting both said fluid-pumps together.

17. Drive mechanism of the character described, comprising a drive shaft, a driven shaft, a variably movable transfer gear between the drive shaft and driven shaft, fluid-pressure means capable of controlling the movement of said transfer gear to produce forward or reverse travel, and a valve having a stem weight-actuated in one direction and centrifugally moved in the other for varying the resistance to fluid-flow for controlling said fluid-pressure means.

18. Drive mechanism of the character described, comprising a drive shaft, a driven shaft, a variably movable transfer gear between the drive shaft and the driven shaft, fluid-pressure pump means including plungers with variable stroke for controlling movement of said transfer gear, and means additional to variation of the stroke-length of said pumps for operating at least a part of the fluid-pressure means with increased output for augmenting the torque-transfer.

19. Drive mechanism of the character described, comprising a drive shaft, a driven shaft, a transfer gear therebetween, fluid-pressure means to control the movement of said transfer gear, ratchet-like means for releasing said drive shaft, and fluid-pressure means for connecting the drive shaft and driven shaft when the ratchet-like means is in release.

20 Drive mechanism of the character described, comprising a drive shaft, a driven shaft, a transfer gear therebetween, means for increasing torque ratio, said means including pump-means having one element connected to said drive shaft and another connected to said transfer gear, another pump having one element connected to said drive shaft, said pump-means including pistons of variably adjustable stroke, and means for opposing fluid-stoppage for both pump-means for direct drive.

21. Drive mechanism of the character described, comprising a drive shaft, a driven shaft, a transfer gear therebetween, means for increasing torque ratio, said means including pump-means having one element connected to said drive shaft and another connected to said transfer gear, another pump having one element connected to said drive shaft, said pump-means including pistons of variably adjustable stroke, means for opposing fluid-stoppage for both pump-means for direct drive, and centrifugal means for controlling such fluid-stoppage.

22. Drive mechanism of the character described, comprising a drive shaft, a driven shaft, a variably movable transfer gear between the drive shaft and the driven shaft and including a cage, pump-means having one element connected to said drive shaft, and another pump-means having one element connected to said first pump-means and another element connected to said cage, the pump-means being of fixed unequal fluid displacement for changing torque-ratio.

23. Drive mechanism of the character described, comprising a drive shaft, a driven shaft, a variably movable transfer gear between the drive shaft and the driven shaft and including a cage, pump-means having one element connected to said drive shaft, another pump-means having one element connected to said first pump-means and another element connected to said cage, the pump-means being of fixed unequal fluid displacement for changing torque-ratio, and means for providing fluid-stoppage in both pumps for direct drive.

24. Drive mechanism of the character described, comprising a drive shaft, a driven shaft, a variably movable transfer gear between the drive shaft and the driven shaft and including a cage, pump-means having one element connected to said drive shaft, another pump-means having one element connected to said first pump-means and another element connected to said cage, the pump-means being of fixed unequal fluid displacement for changing torque-ratio, means for providing fluid-stoppage in both pumps for direct drive, and centrifugal means for controlling such fluid-stoppage.

25. Drive mechanism of the character described, comprising a drive shaft, a driven shaft, a variably movable transfer gear therebetween, fluid-pressure means for controlling the movement of said transfer gear to produce forward or reverse travel, and valve-means for opposing resistance to fluid-flow through said fluid-pressure means, said valve-means including a splinedly aligned closure element and reciprocable control element and a buffer spring interposed therebetween.

26. Drive mechanism of the character described, comprising a drive shaft, a driven shaft, a variably movable transfer gear therebetween, fluid-pressure means including variable-throw pistons for controlling the movement of said transfer gear, and an eccentric cam and a variably-adjustable eccentric thereover intermediary between the pistons for controlling the travel thereof.

27. Drive mechanism of the character described, comprising gearing elements including a drive gear, a driven gear, and a variably movable transfer gear therebetween having a forward pinion means and reverse pinion means, and lever-means for shifting one of said gearing elements to actuate the forward and reverse pinion means.

28. Drive mechanism of the character described, comprising gearing elements including a drive gear, a driven gear, and a variably movable transfer gear therebetween having a casing with forward pinion means and reverse pinion means, lever-means for shifting one of said gearing elements to actuate the forward and reverse pinion means, and fluid-pump means for controlling said casing for increase of torque-ratio.

29. Drive mechanism of the character described, comprising gearing elements including a drive gear, a driven gear, and a variably movable transfer gear therebetween having a casing with forward pinion means and reverse pinion means, lever-means for shifting one of said gearing elements to actuate the forward and reverse pinion means, fluid-pump means for controlling said casing for increase of torque-ratio, and another pump-means for direct drive.

30. Drive mechanism of the character described, comprising gearing elements including a drive gear, a driven gear, and a variably movable transfer gear therebetween having a casing with forward pinion means and reverse pinion means, lever-means for shifting one of said gearing elements to actuate the forward and reverse pinion means, fluid-pump means for controlling casing for increase of torque-ratio, another fluid-pump means for direct drive, and centrifugal means for controlling said last-named pump means.

31. Drive mechanism of the character described, comprising a drive shaft, a driven shaft, a transfer gear therebetween, means for increasing torque, said means including pump-means having one element connected to said drive shaft and another connected to said transfer gear and another pump-means having one element connected to said drive shaft, said pump-means being of unequal fixed displacement, fluid-connections between said pump-means, and valve-means to reverse the direction of drive by reversing the direction of fluid-flow.

32. Drive mechanism of the character described, comprising a drive shaft, a driven shaft, a transfer gear therebetween, means for changing the torque ratio, said means including pump-means having one element connected to said drive shaft and another connected to said transfer gear and another pump-means having one element connected to said drive shaft, said pump-means being of unequal fixed displacement, fluid-connections between said pump-means, and valve-means to reverse the direction of torque-ratio change by reversing the fluid-flow.

33. Drive mechanism of the character described, comprising a drive shaft, a driven shaft, a transfer gear therebetween, means for changing torque ratio, said means including piston pump-means having one element connected to said drive shaft and another connected to said transfer gear, another pump-means having one element connected to said drive shaft, and a timing valve to time the said piston pump-means.

34. Drive mechanism of the character described, comprising a drive shaft, a driven shaft, a transfer gear therebetween, means for changing torque ratio, said means including piston pump-means having one element connected to said drive shaft and another connected to said transfer gear, another pump-means having one element connected to said drive shaft, a timing valve to time the said piston pump-means, and means for varying the torque transfer by varying said timing valve.

35. Drive mechanism of the character described, comprising a drive shaft, a driven shaft, a variably movable transfer gear between the drive shaft and the driven shaft, fluid-pressure means including a variable-throw piston for controlling the movement of said transfer gear, a variable eccentric for operating said piston, and fluid-pressure means for varying said variable eccentric.

36. Drive mechanism of the character described, comprising a drive shaft, a driven shaft, a transfer gear therebetween capable of forward or reverse movement, said gear including idlers and a controllably arrestable element carrying said idlers, fluid-pump means for the operation of said transfer gear, and fluid-pump means for controlling said arrestable element in said transfer gear, at least a part of the pump means including piston rods and eccentric means for varying the length of stroke thereof.

37. Drive mechanism of the character described, comprising a drive shaft, a driven shaft, a transfer gear therebetween capable of forward or reverse movement, said gear including idlers and a controllably arrestable element carrying said idlers, fluid-pump means optionally operable on said arrestable element of said transfer gear, and means including another fluid-pump means for controlling said last-named fluid-pump means.

38. Drive mechanism of the character described, comprising a drive shaft, a driven shaft, a transfer gear therebetween capable of forward or reverse movement, fluid-pressure means to control the movement of said transfer gear forward, fluid-pressure means to control movement of said transfer gear reverse, and centrifugally-operated means for controlling said forward-operating fluid-pressure means.

39. Drive mechanism of the character described, comprising a drive shaft, a driven shaft, a variably movable transfer gear between the drive shaft and the driven shaft, fluid-pressure pump means including plungers with variable stroke for controlling movement of said transfer gear, and retardedly-timed valve-means for operating at least a part of the fluid-pressure means with increased output for augmenting the torque-ratio.

40. Drive mechanism of the character described, comprising a drive shaft, a driven shaft, a variably movable transfer gear between said drive shaft and said driven shaft, fluid-pressure means for controlling said transfer gear, a variable friction seizing clutch having one element connected to said drive shaft and another element connected to said driven shaft, and centrifugally-operated means for engaging said clutch.

41. Drive mechanism of the character described, comprising a drive shaft, a driven shaft, a transfer gear therebetween, and means for driving said driven shaft in one direction with a certain torque-ratio and in the opposite direction with a different torque-ratio, said means including pump-means having one element connected to said drive shaft and another connected to said transfer gear, and another pump-means having one element connected to said driven shaft through said transfer gear, said pump-means being of unequal fixed displacement.

42. Drive mechanism of the character described, comprising shafts to be connected, means for connecting said shafts, including a transfer gear, and eccentric within eccentric controlled variable stroke reciprocating pump set means including an inner eccentric element secured to one said shaft and an outer eccentric element on the inner eccentric element and operating the reciprocating pump means.

43. Drive mechanism of the character described, comprising shafts to be connected, means for connecting said shafts, including a transfer gear and a reciprocating pump set means having piston rods radial to the axis of the shafts, and means for controlling the length of stroke of said piston rods, including cam means arcuately movable transversely to the axis of the shafts.

44. Drive mechanism of the character described, comprising shafts to be connected, means for connecting said shafts, including gearing and fluid-pressure elements, embodying a reciprocating pump means, another reciprocating pump means receiving the discharge therefrom, and variable eccentric means for driving one of the pump means and including an eccentric within an eccentric and control means for setting the eccentrics from maximum eccentricity to neutralized eccentricity and vice versa.

45. Drive mechanism of the character described, comprising shafts to be connected, means for connecting said shafts, including gearing and fluid-pressure elements, embodying sets of pump pistons connected to different shafts, offset connecting rods for the respective sets of pistons, and an adjustable eccentric for operating one such set.

46. Drive mechanism of the character described, comprising shafts to be connected, means connecting said shafts, including gearing and fluid-pressure elements, embodying sets of fluid pump pistons connected to different shafts and forcing fluid one to the other, an arcuately adjustable valve for controlling the fluid flow, and means slidable axially of at least one of the shafts for adjusting said valve.

WILLIAM E. LAWRENCE.